United States Patent Office 3,849,442
Patented Nov. 19, 1974

3,849,442
MANUFACTURE OF 1-ALKENYL-2-AMINO-
METHYL PYRROLIDINES
Eric-Alain Denzler, Zurich, Switzerland, assignor to
Fratmann S.A., Bougeries, Switzerland
No Drawing. Filed May 17, 1972, Ser. No. 254,235
Claims priority, application Switzerland, Sept. 30, 1971,
14,341/71
Int. Cl. C07d 27/04
U.S. Cl. 260—326.85          2 Claims

ABSTRACT OF THE DISCLOSURE

Process for the manufacture of 1-alkenyl-2-aminomethyl pyrrolidines, comprising producing a 1-alkenyl-2-nitromethylene pyrrolidine by successively reacting a 1-alkenyl-2-pyrrolidone with dimethyl sulphate, an alkali alcoholate, and nitromethane, and selectively reducing the nitromethylene group of the 1-alkenyl-2-nitromethylene pyrrolidine by means of lithium aluminum hydride.

The invention relates to processes for the manufacture of 1-alkenyl-2-aminomethyl pyrrolidines.

According to the invention, a process for the manufacture of 1-alkenyl-2-aminomethyl pyrrolidines comprises producing a 1-alkenyl-2-nitromethylene pyrrolidine by successively reacting a 1-alkenyl-2-pyrrolidone with dimethyl sulphate, an alkali alcoholate, and nitromethane, and selectively reducing the nitromethylene group of the 1-alkenyl-2-nitromethylene pyrrolidine.

This selective reduction of the nitromethylene group of the 1-alkenyl-2-nitromethylene pyrrolidine may be carried out simply and with a good yield by means of lithium aluminium hydride, whereupon a 1-alkenyl-2-aminomethyl pyrrolidine is obtained.

The process according to the invention takes place in accordance with the following chemical reaction diagrams:

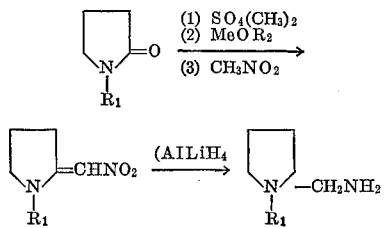

where:

$R_1$ represents an alkenyl group;
$R_2$ represents an alkyl radical; and
Me represents an alkali metal, such as sodium or potassium.

An example of a manner in which the process according to the invention may be carried out in practice, to manufacture 1-allyl-2-aminomethyl pyrrolidine, will now be described step by step:

(a) Preparation of 1-allyl-2-pyrrolidone 700 ml. of ethyl alcohol and 46 g. (2× gramme atomic weight) of sodium, divided into small portions, are placed in a 2-litre flask equipped with a stirrer, a thermometer and cooling means, the temperature being maintained at between 60 and 70° C.

The flask and its contents are then cooled down to room temperature, and a fine stream of 170 g. (2 moles) of pyrrolidone is run in. After stirring for thirty minutes, the excess ethyl alcohol is distilled off in vacuo and 800 ml. of toluene is added, the last traces of alcohol then being distilled off at normal atmospheric pressure.

The reaction mixture is then cooled down to 20° C. and 280 g. (2.33 moles) of freshly distilled allyl bromide is added drop by drop over a period of about one and a half hours.

At about half way through this addition, the temperature rises to about 90° C. and is maintained at this value.

The reaction mixture is then reflux-distilled for three hours, after which it is allowed to cool, and is separated from the precipitate so formed. This filtrate is distilled in vacuo. The fraction distilling between 110 and 120° C. at a pressure of 10 mm. of mercury is retained, the said fraction consisting of 195 g. (77% by weight) of 1-allyl-2-pyrrolidone.

(b) Preparation of 1-allyl-2-nitromethylene pyrrolidine

The reaction takes place as follows:

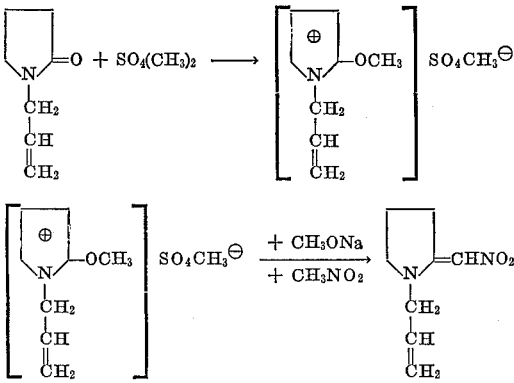

156 g. (1.25 moles) of the 1-allyl-2-pyrrolidone and 157.5 g. (1.25 moles) of dimethyl sulphate are placed in a 2-litre reaction vessel equipped with a stirrer, a thermometer and cooling means. The mixture is heated up to between 60 and 65° C. and maintained at this temperature for one and a half hours. After cooling to between 10° C. and 15° C., a solution of sodium methylate (sodium methoxide), prepared by allowing 29 g. of metallic sodium to react with 750 ml. methyl alcohol, is added drop by drop.

The reaction mixture is then stirred for one hour, the temperature being allowed to rise to 20° C. After this, 115 g. (1.9 moles) of nitromethane is added, and the mixture is stirred until complete solution occurs.

The reaction mixture is then allowed to stand overnight, after which the excess methyl alcohol is distilled off in vacuo, and the residue taken up with 2 litres of water. After filtration and washing with water, 150 g. (72% by weight) of 1-allyl-2-nitromethylene pyrrolidine (M.P. 72° C.) is obtained.

(c) Preparation of 1-allyl-2-aminomethyl pyrrolidine 137 g. (3.6 moles) of lithium aluminium hydride is placed in a 6-litre reaction vessel equipped with a stirrer, cooling means and a dropping funnel with a stream of nitrogen being passed through, and 700 ml. of tetrahydrofuran is added drop by drop.

The mixture is then cooled to about 0° C., and a solution of 202 g. (1.2 moles) of the 1-allyl-2-nitromethylene pyrrolidine in 800 ml. tetrahydrofuran is added, without allowing the temperature to rise above 10° C.

The mixture is then allowed to react with stirring for four hours at 5° C., after which 300 ml. ethyl acetate, 137 ml. water, 137 ml. of 10% sodium carbonate solution and 410 ml. water are added drop by drop in the foregoing order, the temperature being maintained at below 10° C.

After filtration, the precipitate is washed with 300 ml. of tetrahydrofuran followed by 300 ml. of ethyl acetate.

After evaporating off the solvents, the aqueous solution is saturated when cold with sodium chloride, and twice extracted with 150 ml. benzene. After drying over anhydrous potassium carbonate and filtering, the benzene is evaporated off and the reaction product distilled between 81° and 120° C. at a pressure of 19 mm. of mercury. Redistillation gives 102 g. (61% by weight) of 1-allyl-2-aminomethyl pyrrolidine (B.P. 82° C. at 22 mm. mercury).

The 1-alkenyl-2-aminomethyl pyrrolidines obtained by the process according to the invention are valuable intermediate products in the chemical industry, particularly in the pharmaceutical branch, for the manufacture of medical products, notably in the gastro-enterological and neurological fields.

What is claimed is:

1. A process for the manufacture of 1-allyl-2-aminomethyl pyrrolidine which comprises the steps of methylating 1-allyl-2-pyrrolidone with dimethyl sulfate; then treating the resultant methylated product with an alkali alkanol and nitromethane to form 1-allyl-2-nitromethylene pyrrolidine and then selectively reducing the nitromethylene group to form 1-allyl-2-aminomethyl pyrrolidine by reducing said 1-allyl-2-nitromethylene pyrrolidine with lithium aluminum hydride.

2. The process according to claim 1 wherein said allyl pyrrolidone prepared by reacting pyrrolidone with an allyl halide.

References Cited

UNITED STATES PATENTS 3,708,497  1/1973  Kamiya et al. _____ 260—326.8

OTHER REFERENCES

Noller: *Chemistry of Organic Compounds* (1965), p. 282.

Smith: *Open-Chain Nitrogen Compounds*, Vol. 1 (1965), p. 65.

JOSEPH A. NARCAVAGE, Primary Examiner

U.S. Cl. X.R.

260—326.5 R, 999